Figures 1, 2:
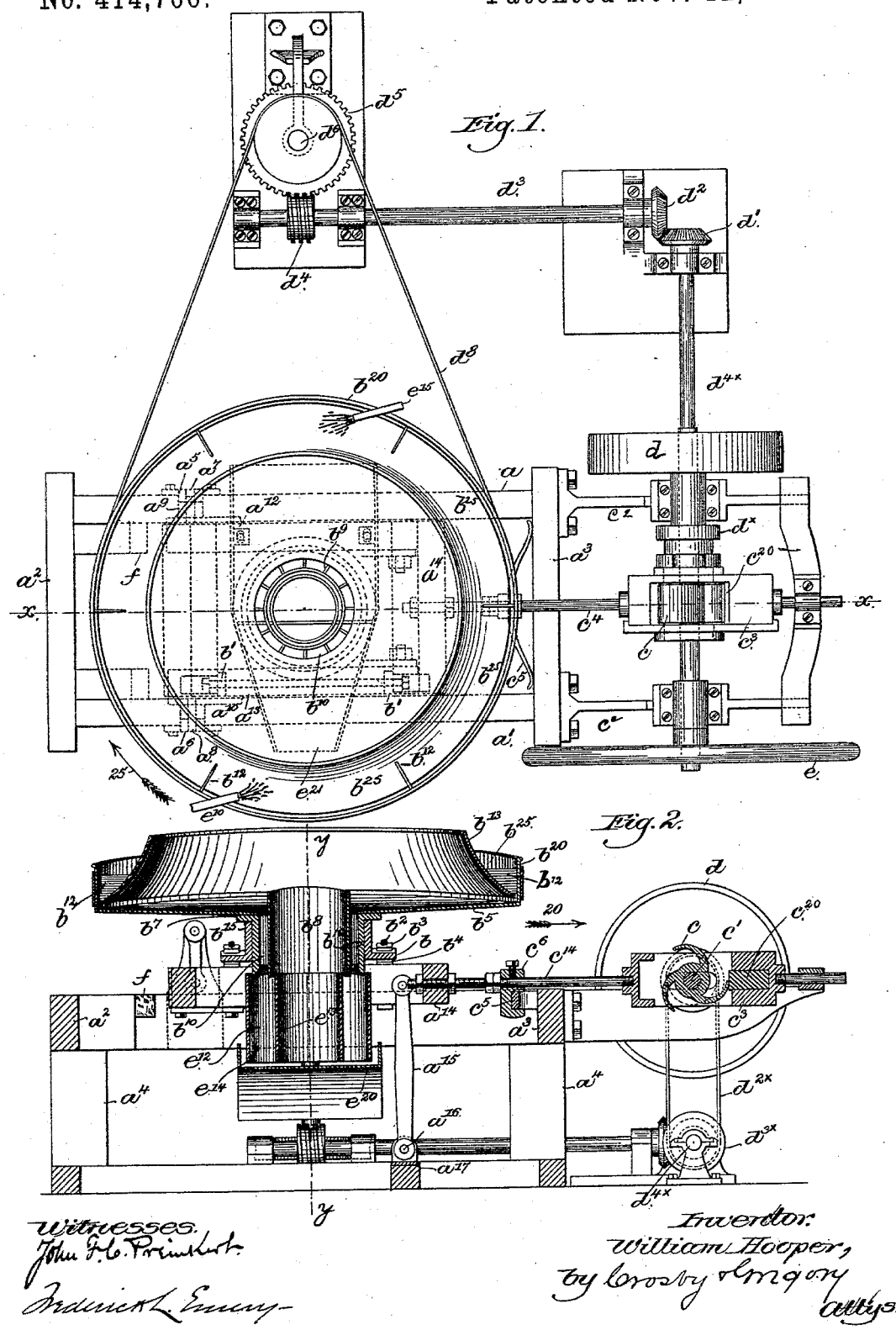

(No Model.) 2 Sheets—Sheet 1.

W. HOOPER.
ORE SEPARATOR.

No. 414,706. Patented Nov. 12, 1889.

Witnesses:
John F. C. Prindlust.
Frederick L. Emery.

Inventor:
William Hooper,
by Crosby & Gregory
Attys.

(No Model.) 2 Sheets—Sheet 2.

W. HOOPER.
ORE SEPARATOR.

No. 414,706. Patented Nov. 12, 1889.

Fig. 3.

Witnesses.
John F. C. Printkert
Frederick L. Emery

Inventor.
William Hooper.
by Crosby & Gregory attys

UNITED STATES PATENT OFFICE.

WILLIAM HOOPER, OF TICONDEROGA, NEW YORK.

ORE-SEPARATOR.

SPECIFICATION forming part of Letters Patent No. 414,706, dated November 12, 1889.

Application filed May 24, 1889. Serial No. 311,981. (No model.)

*To all whom it may concern:*

Be it known that I, WILLIAM HOOPER, of Ticonderoga, county of Essex, State of New York, have invented an Improvement in Ore-Separators, of which the following description, in connection with the accompanying drawings, is a specification, like letters on the drawings representing like parts.

This invention has for its object the production of a novel ore-separator adapted to be effectively used in separating coarse and finely-pulverized ores, my improved separator being capable of being employed both for mining and laboratory purposes.

In accordance with my invention a preferably concave pan or table is mounted on a reciprocating bed to rotate thereon, and the bed is suspended, as will be described, so that one end of the said bed is raised on its movement in one direction, whereby the heavier particles in the pan—viz., the ore—are thrown outwardly toward the circumference of the pan, and thus separated from lighter particles or earthy matter, which are preferably washed toward the center of the pan, where they are discharged into a suitable chute.

My invention in ore-separators consists, essentially, in the combination, with a revolving pan or table provided with an opening, of a reciprocating bed having an opening to register with the opening in the said pan and upon which the said pan or table is revolved, substantially as will be described.

Other features of my invention will be pointed out in the claims at the end of this specification.

Figure 1 is a top or plan view of an ore-separator embodying my invention; Fig. 2, a longitudinal section of the apparatus shown in Fig. 1 on line $xx$; and Fig. 3, a transverse section of the apparatus on line $yy$, Fig. 2.

The frame to support the working parts of the apparatus consists, as herein shown, of sides $a$ $a'$ and end pieces $a^2$ $a^3$, sustained by suitable uprights $a^4$. The side pieces $a$ $a'$, near one end of the apparatus, have secured to them uprights or brackets $a^5$ $a^6$, forming bearings for shafts $a^7$ $a^8$, upon which are mounted links $a^9$ $a^{10}$, to which are secured one end of side bars $a^{12}$ $a^{13}$, united by cross-pieces $a^{14}$, the said side bars $a^{12}$ $a^{13}$ and cross-pieces $a^{14}$ forming the reciprocating bed of the apparatus. The rear end of the reciprocating bed is sustained, as herein shown, by links $a^{15}$, having their upper ends pivoted to the side bars $a^{12}$ $a^{13}$ and their lower ends pivoted, as at $a^{16}$, to a firm or solid portion $a^{17}$ of the frame-work. The reciprocating bed supports a bed-plate $b$, hinged, as at $b'$, to one side bar, as $a^{13}$, and having its other end vertically adjustable by means of bolts or rods $b^2$, extended up through the side bar $a^{12}$ and provided with adjusting-nuts $b^3$ $b^4$. The bed-plate $b$ is provided with a circular opening surrounded by a flange or collar $b^{15}$, upon which the preferably circular pan or table $b^5$ is turned, the said pan or table being provided with a central opening and having secured to or forming part of it below the said opening a hollow axis $b^{16}$, provided with a flange $b^7$, which rests directly upon the flange $b^{15}$. Within the hollow axis $b^{16}$ is located a pipe $b^8$ of smaller diameter, forming with the hollow axis $b^{16}$ an annular space, which is preferably divided into pockets $b^{10}$ by plates $b^9$, the said pipe being secured to the plates $b^9$, which are soldered or otherwise fastened to the hollow axis. The pan or table $b^5$ is preferably made concaved and provided with a circular rim $b^{20}$, to which is secured, as by partition-plates or tie-bars $b^{12}$, a preferably conical ring $b^{13}$, which forms with the rim of the pan a space divided into chambers $b^{25}$ by the plates $b^{12}$, into which the pulverized ore is fed.

The reciprocating bed is operated, as herein shown, by cam-shaped arms $c$ on a hub secured to a shaft $c'$, having bearings in side bars $c^2$, herein shown as bolted to the cross-bar $a^3$ of the frame. The cam-arms $c$, as herein shown, act on a buffer $c^{20}$, secured to or forming part of a box or frame $c^3$, joined by a connecting-rod $c^4$ to the cross-bar $a^{14}$, and produce movement of the bed in one direction, as indicated by arrow 20, the said bed being moved in the opposite direction, as herein shown, by a spring $c^5$, secured to a block or support $c^6$, fastened on the connecting-rod. The main shaft $c'$ is provided with a driving-pulley $d$, and, as shown, with a cone-pulley $d^{\times}$, connected by belt $d^{2\times}$ to a cone-pulley $d^{3\times}$ on a shaft $d^{4\times}$, provided at its end with a bevel-gear $d'$ in mesh with a beveled gear $d^2$ on a shaft $b^3$, provided with a worm $d^4$ in mesh with a gear $d^5$ on a shaft $d^6$, connected by a band or belt $d^8$ to the pan $b^5$, by which rotation is imparted to the said pan and its attached parts. The main shaft $c'$ is also provided, as shown, with a hand-wheel $e$, by which the bed may be reciprocated when the main shaft is disconnected from the driving-shaft. (Not shown.) By suspending the front end of the bed with short links pivoted above the bed that end of the bed is thrown up on the forward movement of the bed, thereby imparting to the material in the pan a shoveling action.

In operation one end of the bed-plate $b$ will preferably be raised by adjusting the nuts $b^3$ $b^4$ on the threaded rods or bolts so as to incline or tip the pan toward one side, and the material to be treated will be fed into the pan at its lowest side. The pan is revolved by the belt $d^8$, and at the same time it is being revolved the bed is reciprocated, and as a result of these two motions the crude ore or material deposited in the pan at its lowest side is gradually carried around, as in the direction indicated by arrow 20, Fig. 1. As the pan is revolved, the material therein is subjected to a shoveling action on the forward movement of the bed, caused by the spring $c^5$, and the heavier particles—namely, the ore—are thrown up the inclined bottom of the pan toward its rim, while at the same time the lighter particles—namely, the earthy matter—are washed by a suitable spray-pipe, as $e^{10}$, toward the center of the pan, the earthy material mixed with water passing into the pockets $b^{10}$ at the lowest side of the pan, and thence through a passage-way $e^{12}$, formed, as herein shown, by pipes $e^{13}$ $e^{14}$, suspended in any suitable manner below the pan. The ore which is thus separated from its earthy matter is subjected to a spray or stream of water issuing through a pipe $e^{15}$, when that portion of the pan holding the separated ore has been brought into its highest position, which is substantially opposite the point at which the material or crude ore is first deposited in the pan. When the separate ore has been brought into its highest position, as described, it is washed down the inclined bottom of the pan into the pockets $b^{10}$ at that side of the machine and passes down into a chute or hopper $e^{20}$, leading in an opposite direction to the hopper $e^{21}$, in which the earthy matter is deposited. In practice the ore washed from the highest position of the pan is completely separated from earthy matter.

My improved machine is especially adapted for treating finely-pulverized ores or slimes, and when it is to be thus used the buffers $f$, which are secured to the frame and located so as to be struck by the bed on its forward movement, are adjusted or brought nearer the bed, so as to receive a great blow, and thereby cause an increased jar of the table or pan, and as a result cause the finer particles of the ore to settle and adhere to the bottom of the pan or table and be carried away free from earthy matter to the discharging-point substantially opposite the feeding-point.

My improved machine is especially adapted to be used in laboratories, in which case the main shaft $c'$ may be rotated by hand, and when constructed on a large scale for mining purposes the rapid forward motion will, preferably, be obtained by the well-known variable cam-motion.

The bottom of the pan or table is herein shown plain or smooth; but, if desired, it may be made corrugated.

I claim—

1. In an ore-separator, the combination, with a revolving pan or table provided with a central opening, of a reciprocating bed having an opening to register with the opening in the said pan and upon which the said pan or table is revolved, substantially as and for the purpose specified.

2. In an ore-separator, the combination, with a concaved revolving pan or table provided with a central opening, of a reciprocating bed provided with an opening to register with the opening in the said pan, substantially as described.

3. In an ore-separator, the combination, with a revolving pan provided with a hollow axis, of a reciprocating bed provided with an adjustable bed-plate, whereby the said pan may be tipped or inclined, substantially as described.

4. In an ore-separator, the combination, with a concaved revolving pan provided with a hollow axis, of a reciprocating bed provided with an adjustable bed-plate having an opening into which the hollow axis is inserted, substantially as described.

5. In an ore-separator, the combination, with a concaved revolving pan provided with a hollow axis, of a bed provided with an adjustable bed-plate having an opening into which the hollow axis is inserted, links, substantially as described, to support said bed at its opposite ends, and means to reciprocate said bed, substantially as described.

6. In an ore-separator, the combination, with a concaved revolving pan provided with a hollow axis, of a reciprocating bed provided with an adjustable bed-plate having an opening into which the hollow axis is inserted, a pipe $b^8$, located in said hollow axis, and plates $b^9$, to form pockets $b^{10}$ between said hollow axis and pipe $b^8$, substantially as described.

In testimony whereof I have signed my name to this specification in the presence of two subscribing witnesses.

WILLIAM HOOPER.

Witnesses:
 HERBERT WHEELER,
 F. H. WELLS.